United States Patent
Braytenbaum et al.

(10) Patent No.: US 9,009,239 B1
(45) Date of Patent: Apr. 14, 2015

(54) SYSTEM, METHOD, AND COMPUTER PROGRAM FOR PROVIDING ACCESS TO A PLURALITY OF SERVICES THROUGH A UNIFIED APPLICATION

(75) Inventors: Amit Braytenbaum, Jaffa (IL); Oren Agassy, Lavon (IL)

(73) Assignee: Amdocs Software Systems Limited, Dublin (IE)

( * ) Notice: Subject to any disclaimer, the term of this patent is extended or adjusted under 35 U.S.C. 154(b) by 173 days.

(21) Appl. No.: 13/015,525

(22) Filed: Jan. 27, 2011

(51) Int. Cl.
| | |
|---|---|
| G06F 3/00 | (2006.01) |
| G06F 15/16 | (2006.01) |
| G06F 7/04 | (2006.01) |
| G06F 17/30 | (2006.01) |
| H04L 29/06 | (2006.01) |
| H04L 29/08 | (2006.01) |
| H04L 12/58 | (2006.01) |
| G06Q 30/02 | (2012.01) |

(52) U.S. Cl.
CPC ............ *H04L 67/2838* (2013.01); *H04L 51/32* (2013.01); *H04L 67/02* (2013.01); *H04L 63/08* (2013.01); *G06Q 30/0255* (2013.01); *G06Q 30/0269* (2013.01)

(58) Field of Classification Search
CPC . H04L 67/2838; H04L 67/02; H04L 63/0815; H04L 67/2833; H04L 67/0869; H04L 63/08; H04L 51/32; G06Q 30/0255; G06Q 30/0269
USPC .................. 709/225, 206; 705/319; 707/707; 715/742, 745, 758; 713/169; 726/8, 5
See application file for complete search history.

(56) References Cited

U.S. PATENT DOCUMENTS

| | | | | |
|---|---|---|---|---|
| 6,141,010 | A * | 10/2000 | Hoyle | 715/854 |
| 6,941,307 | B2 * | 9/2005 | Papanikolaou et al. | 715/742 |
| 6,968,539 | B1 * | 11/2005 | Huang et al. | 717/115 |
| 2008/0083003 | A1 * | 4/2008 | Biniak et al. | 725/110 |
| 2008/0172496 | A1 * | 7/2008 | Middleton et al. | 709/246 |
| 2009/0234910 | A1 | 9/2009 | Chung et al. | |
| 2009/0276771 | A1 * | 11/2009 | Nickolov et al. | 717/177 |
| 2009/0282473 | A1 | 11/2009 | Karlson et al. | |
| 2009/0319436 | A1 | 12/2009 | Andra et al. | |
| 2010/0293035 | A1 * | 11/2010 | Athsani et al. | 705/10 |
| 2011/0093784 | A1 * | 4/2011 | Kiraz et al. | 715/719 |
| 2011/0208585 | A1 * | 8/2011 | Daboll et al. | 705/14.53 |
| 2012/0117626 | A1 * | 5/2012 | Yates et al. | 726/4 |
| 2012/0139940 | A1 * | 6/2012 | Chavanne | 345/629 |
| 2012/0303712 | A1 * | 11/2012 | Polis et al. | 709/204 |

OTHER PUBLICATIONS

Meebo, Abbout Meebo, 2005, retrieved from www.meebo.com/about/ on Jan. 27, 2011.
dotSyntax,LLC, Digsby = IM = Email = Social Networks, 2007, retrieved from www.digsby.com on Jan. 27, 2011.

* cited by examiner

*Primary Examiner* — Linglan Edwards
*Assistant Examiner* — Forrest Carey
(74) *Attorney, Agent, or Firm* — Zilka-Kotab, PC

(57) ABSTRACT

A system, method, and computer program product are provided for providing access to a plurality of services through a unified application. In use, a plurality of services is associated with a unified application of an entity. Additionally, the unified application is installed within a landing page of the entity. Further, access to the plurality of services is provided to a plurality of users through the unified application of the landing page.

20 Claims, 5 Drawing Sheets

SYSTEM, METHOD, AND COMPUTER PROGRAM FOR PROVIDING ACCESS TO A PLURALITY OF SERVICES THROUGH A UNIFIED APPLICATION

FIELD OF THE INVENTION

The present invention relates to providing a plurality of services, and more particularly to optimizing user interaction with a plurality of services.

BACKGROUND

Online services have become an increasingly important medium for business communication. For example, social media have become a desired communication channel for consumers, and have also become a preferred communication and marketing platform for enterprises as well as brands. Unfortunately, conventional methods of utilizing such online services have exhibited various limitations. For example, conventional methods of utilizing a plurality of online services fail to provide for unified authentication, management, and tracking of service usage.

There is thus a need for addressing these and/or other issues associated with the prior art.

SUMMARY

A system, method, and computer program product are provided for providing access to a plurality of services through a unified application. In use, a plurality of services is associated with a unified application of an entity. Additionally, the unified application is installed within a landing page of the entity. Further, access to the plurality of services is provided to a plurality of users through the unified application of the landing page.

DETAILED DESCRIPTION

Figure 1:
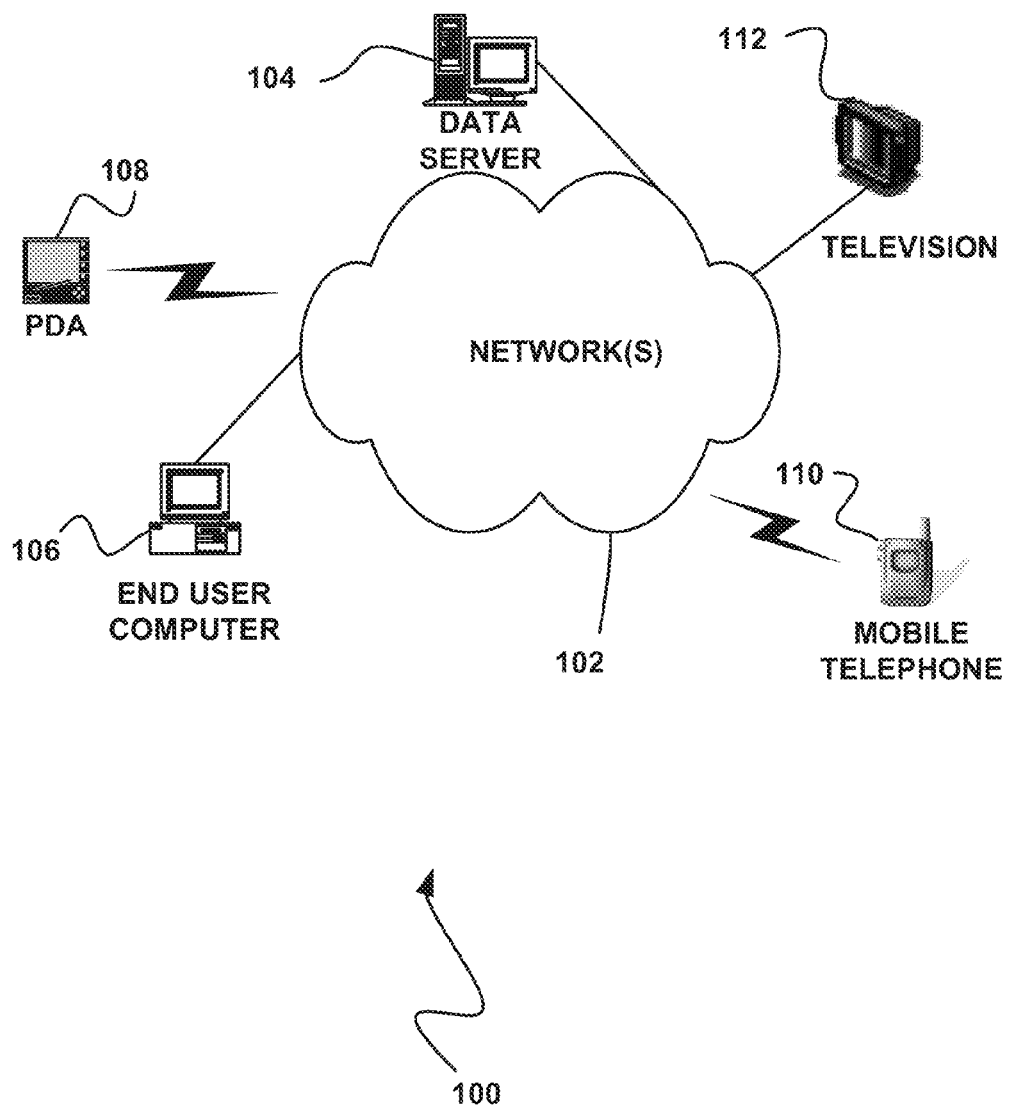
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
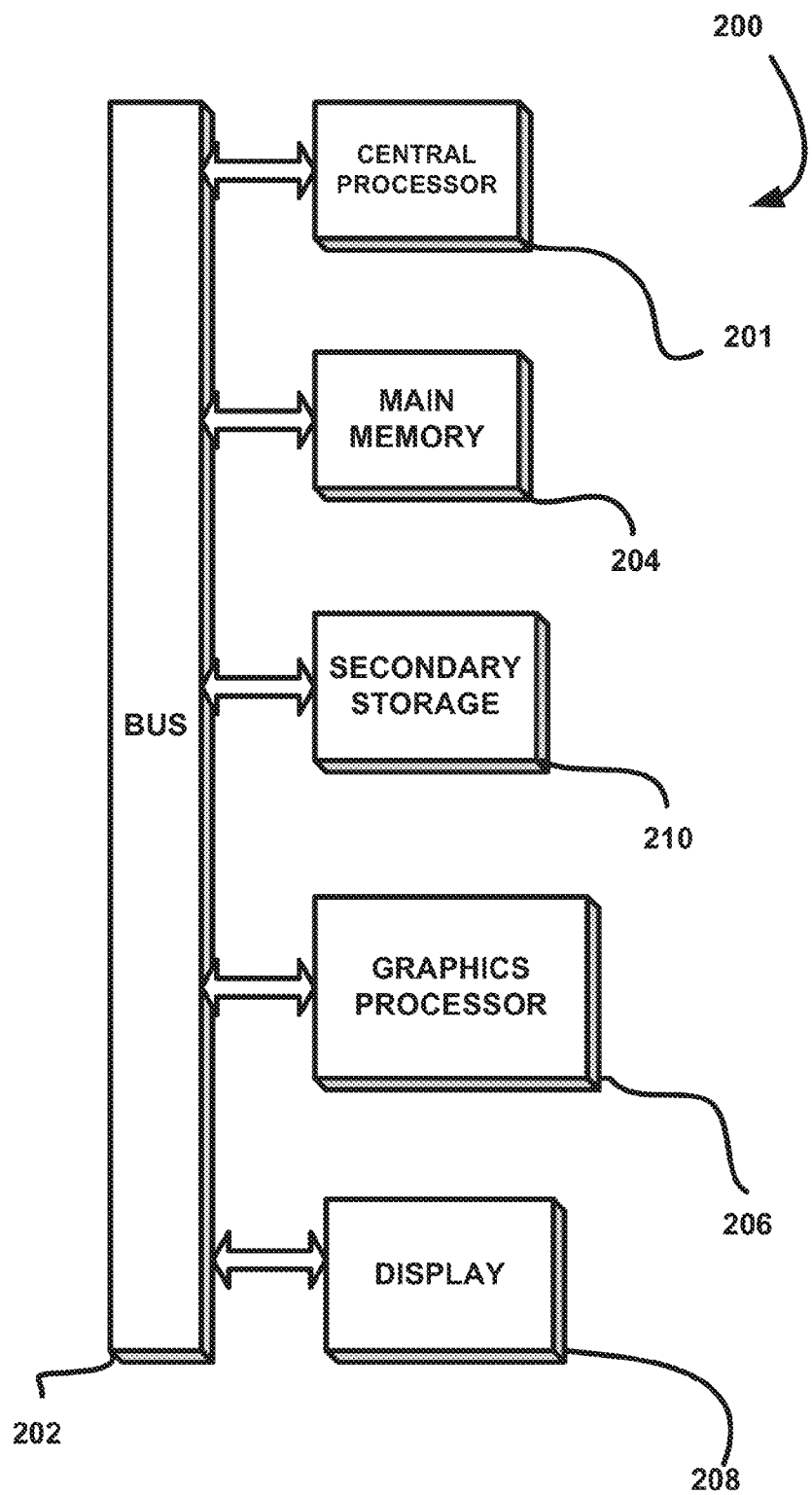
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
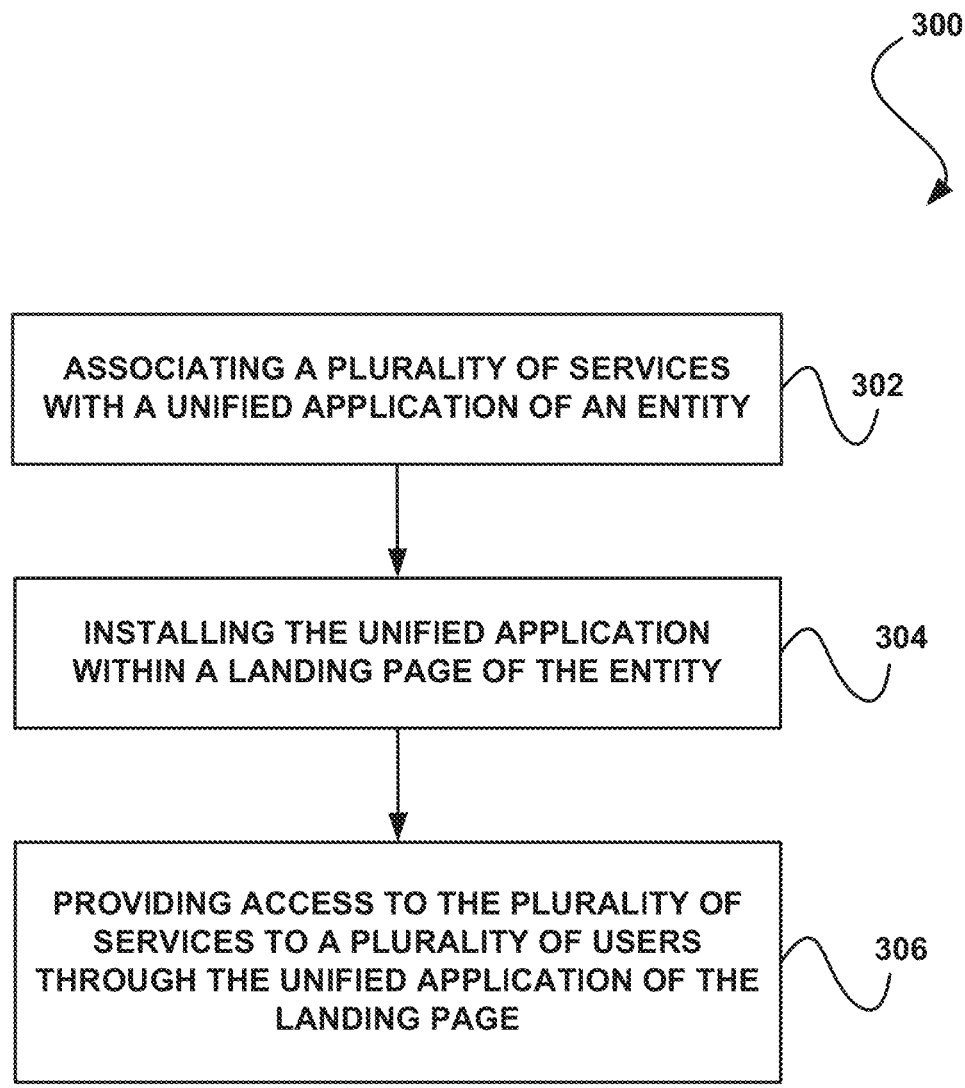
FIG. 3 illustrates a method for providing access to a plurality of services through a unified application, in accordance with one embodiment.

FIG. 3 illustrates a method 300 for providing access to a plurality of services through a unified application, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, a plurality of services is associated with a unified application of an entity. In one embodiment, the plurality of services may include one or more applications. For example, the plurality of services may include one or more third party applications, mobile applications, cloud applications, entity based applications, etc. In another embodiment, the plurality of services may include social media services.

For example, the plurality of services may include one or more of a social messaging service, an image sharing service, a video sharing service, etc. In yet another embodiment, the plurality of services may include one or more web pages. For example, the plurality of services may include one or more social media web pages, video playback web pages, entertainment web pages, etc. In still another embodiment, the plurality of services may require additional information (e.g., from a user of the services, a provider of the services, etc.). For example, the plurality of services may each require one or more of authentication, approval, identification, etc.

Additionally, in one embodiment, the plurality of services may include one or more services associated with the entity. For example, the plurality of services may include an application developed by the entity. In another embodiment, the plurality of services may include one or more services developed by a party other than the entity (e.g., one or more third party applications, etc.). In yet another embodiment, one or more of the plurality of services may operate according to a predetermined protocol.

In still another embodiment, one or more of the plurality of services may be locally installed (e.g., installed within the entity, etc.). Additionally, in one embodiment, one or more of the plurality of services may be cloud based (e.g., installed within a cloud computing environment, etc.). Further, in another embodiment, one or more of the plurality of services may be mobile based (e.g., installed and/or run within a mobile device environment, etc.).

Further, in one embodiment, the unified application may include any platform associated with the entity that manages the plurality of services for the entity. For example, the unified application may control the display of one or more of the plurality of services. In another example, the unified application may control input provided to one or more of the plurality of services. In yet another example, the unified application may manage compatibility (e.g., of a device used to view the plurality of services, etc.), eligibility (e.g., based on one or more business parameters, etc.), personalization (e.g., based on one or more user profiles, etc.), etc. Of course, however, the unified application may manage the plurality of services in any manner. In another embodiment, the unified application may be associated with an application engine. In yet another embodiment, the entity may include one or more of a particular brand, organization, company, individual, etc.

Further still, as shown in operation 304, the unified application is installed within a landing page of the entity. In one embodiment, the landing page of the entity may include a page associated with the entity that is displayed to one or more users. For example, the landing page may include one or more of a web page associated with the entity (e.g., a main or central page associated with the entity, etc.), a portal associated with the entity, etc. In another embodiment, the unified application may be displayed to a user from within the landing page of the entity. For example, the unified application may be displayed within a window located on the landing page.

Also, as shown in operation 306, access to the plurality of services is provided to a plurality of users through the unified application of the landing page. In one embodiment, one or more of the plurality of services may be displayed to the plurality of users via the unified application. For example, the unified application may display one or more images, messages, videos, or other information associated with the plurality of services to the plurality of users.

In another embodiment, each of the plurality of users may have to log in to one or more of the landing page and the unified application in order to access the plurality of services. For example, each of the plurality of users may have to provide one or more of a user name and password in order to access the landing page and plurality of services. In yet another embodiment, one or more actions of one or more of the plurality of users may be recorded by the unified application. For example, the unified application may track each user's actions with respect to the plurality of services (e.g., service usage, messages, videos, and images viewed, messages sent, etc.).

Additionally, in one embodiment, the one or more actions may be recorded in response to one or more criteria. For example, the one or more actions of a user may be tracked in response to the user connecting to the landing page of the entity, consuming one of the plurality of services managed by the unified application, etc. In another embodiment, one or more elements associated with the plurality of users may be recorded by the unified application. For example, a time at which a user logged in to the landing page and/or unified application may be recorded. In another example, the length of time the user accesses one or more of the plurality of services may be recorded. In yet another example, a source that referred the user to the landing page may be recorded.

Furthermore, in one embodiment, the one or more actions of the users and the one or more elements associated with the users may be recorded utilizing one or more monitoring modules. For example, one or more monitoring application programming interfaces (APIs) may record and report the actions and associated elements. In another embodiment, the one or more actions of the users and the one or more elements associated with the users may be stored. For example, the one or more actions of the users and the one or more elements associated with the users may be stored in a database (e.g., a user profile database, etc.) associated with the entity.

Further still, in one embodiment, a profile of one or more of the plurality of users may be determined, based on their recorded actions and associated elements. For example, a categorization may be determined for a user according to which of the plurality of services they access, how long they access the services, how often they access the landing page, etc. In yet another embodiment, the determined profiles may be stored in a database (e.g., the user profile database, etc.).

Also, in one embodiment, the landing page of the entity may be personalized for each of the plurality of users. In one embodiment, the personalization of the landing page may be based on the profile determined for each of the plurality of users. For example, a messaging and/or promotional banner may be selected based on a profile of a user and may be presented to that user when the user accesses the landing page. In another embodiment, access to the plurality of services may be configured based on the determined profile. For example, for each service associated with the unified application, the entity may configure one or more rules for the way the service is exposed to the plurality of users.

More specifically, one or more eligibility rules may be established within the unified application that dictate when a user may access a particular service. For example, the entity may establish a rule within the unified application that allows a particular application to be installed from the unified application only if another application is installed first. In another example, the entity may establish a rule within the unified application that allows a user to view a page within the unified application only after visiting the landing page a predetermined amount of times within a certain time period. In another embodiment, one or more of the plurality of services may be customized, personalized, etc. based on information gathered from another service. In this way, a cross-service exchange of information may be utilized in order to enhance access to the plurality of services.

Additionally, in one embodiment, the unified application may be in communication with a media platform external from the entity and landing page. For example, the unified application may be in communication with a social media platform. In another embodiment, the social media platform may provide one or more of the plurality of services to the unified application. In yet another embodiment, the unified application may manage the plurality of services such that the plurality of services may be seen to the media platform as a single entity. For example, the unified application of the landing page may include an enterprise landing page of a social networking web site (e.g., Facebook™, etc.) that hosts multiple applications of the social networking web site.

In still another embodiment, the unified application may manage the plurality of services. For example, the unified application may require a single authentication (e.g., a username and password, etc.) for each user that accesses the landing page, and may in turn provide access to the plurality of services to the user, using the single authentication.

In this way, the unified application may expose the plurality of services associated with it based on eligibility rules. Additionally, the recorded user actions and determined profile for the user based on those actions may be used for analysis by the entity as well as personalization, targeted advertising, etc. Further, each user may only need a single authentication, authorization, or approval in order to access all of the plurality of services. Further still, the plurality of services may be encapsulated under the entity.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
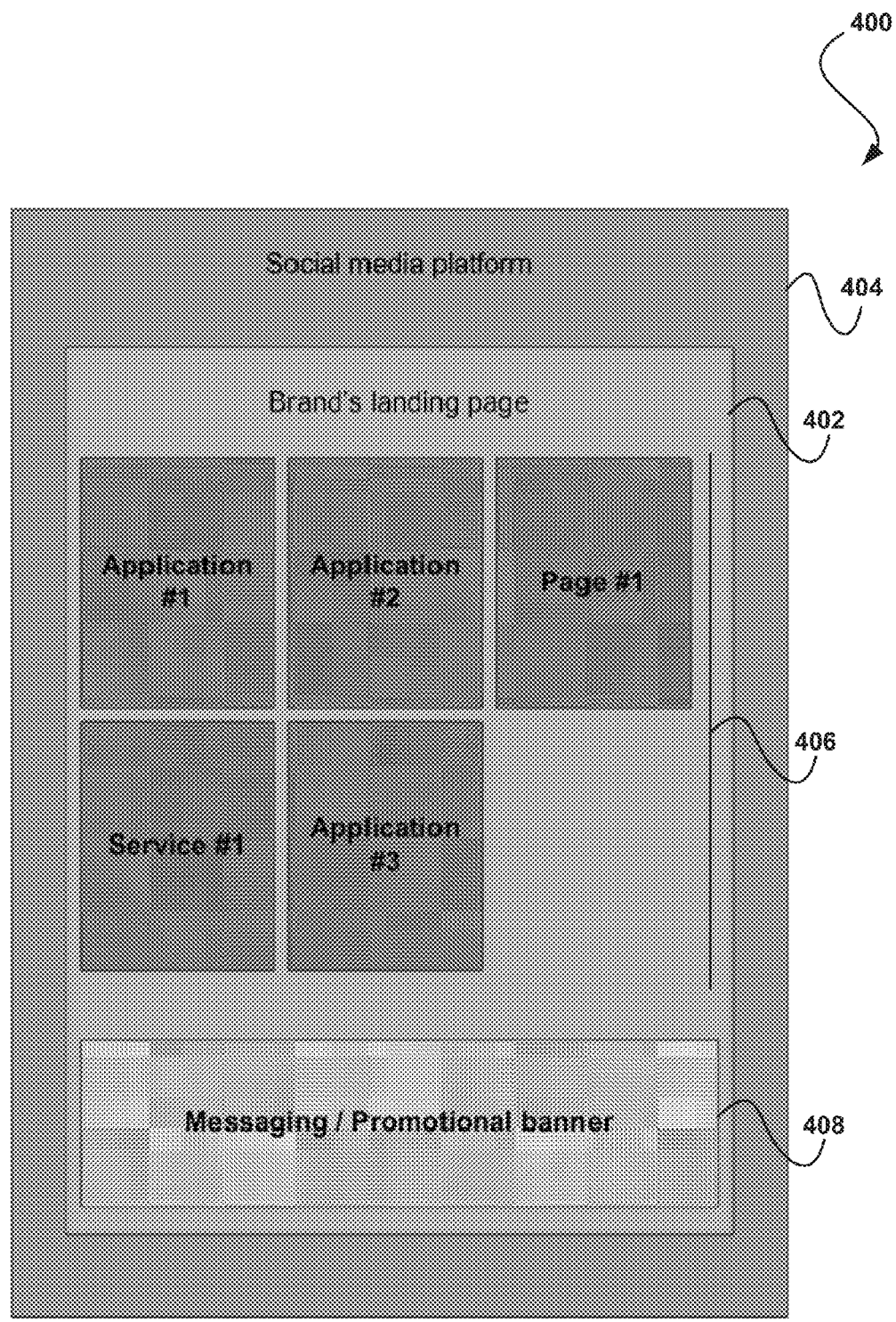
FIG. 4 illustrates an exemplary unified landing page layout, in accordance with another embodiment.

FIG. 4 illustrates an exemplary unified landing page layout 400, in accordance with another embodiment. As an option, the landing page layout 400 may be implemented in the context of the details of FIGS. 1-3. Of course, however, the landing page layout 400 may be implemented in any desired environment. Further, the aforementioned definitions may equally apply to the description below.

As shown, the landing page layout 400 includes a landing page 402 situated within a social media platform 404. In one embodiment, the landing page 402 and the social media platform 404 may be displayed within a browser (e.g., a web browser, a network browser, etc.). In another embodiment, the landing page 402 may be accessed by selecting a hyperlink or other element of the social media platform 404. In yet another embodiment, the landing page 402 may be accessed by inputting a network address associated with the landing page 402 into the browser.

Additionally, in one embodiment, the landing page 402 may be displayed on a network page associated with a particular entity. For example, the landing page 402 may be displayed on a brand's web page. In another example, the landing page 402 may be displayed on a portal associated with the brand. Of course, however, the landing page 402 may be displayed on any type of network page associated with the particular entity.

Further, the landing page 402 includes a plurality of services 406. In one embodiment, the plurality of services 406 may be provided by the social media platform 404. In another embodiment, the plurality of services 406 may be provided by a plurality of social media platforms in addition to the social media platform 404. Further still, the landing page 402 includes a promotional banner 408. In one embodiment, the promotional banner 408 may include one or more advertisements directed towards a user accessing the landing page 402.

In another embodiment, the advertisements displayed within the promotional banner 408 may be determined based on the user's interaction with the landing page 402. For example, a unified application associated with the landing page 402 may track which of the plurality of services 406 are accessed by the user, the amount of time the user interacts with the plurality of services 406, and any other actions of the user with respect to the landing page 402. Additionally, the unified application may analyze the results of the tracking and select relevant material for the promotional banner 408 based on the analysis.

In this way, a user may more easily access each of the plurality of services 406 through the landing page 402, where such services 406 may be provided in a concise and organized manner. Additionally, by using the landing page 402, the user may avoid having to directly access the services through a variety of different pages, channels, portals, etc. Further, the brand may easily direct advertising to individual users based on their interaction with the landing page 402 in the form of the directed promotional banner 408.

Figure 5:
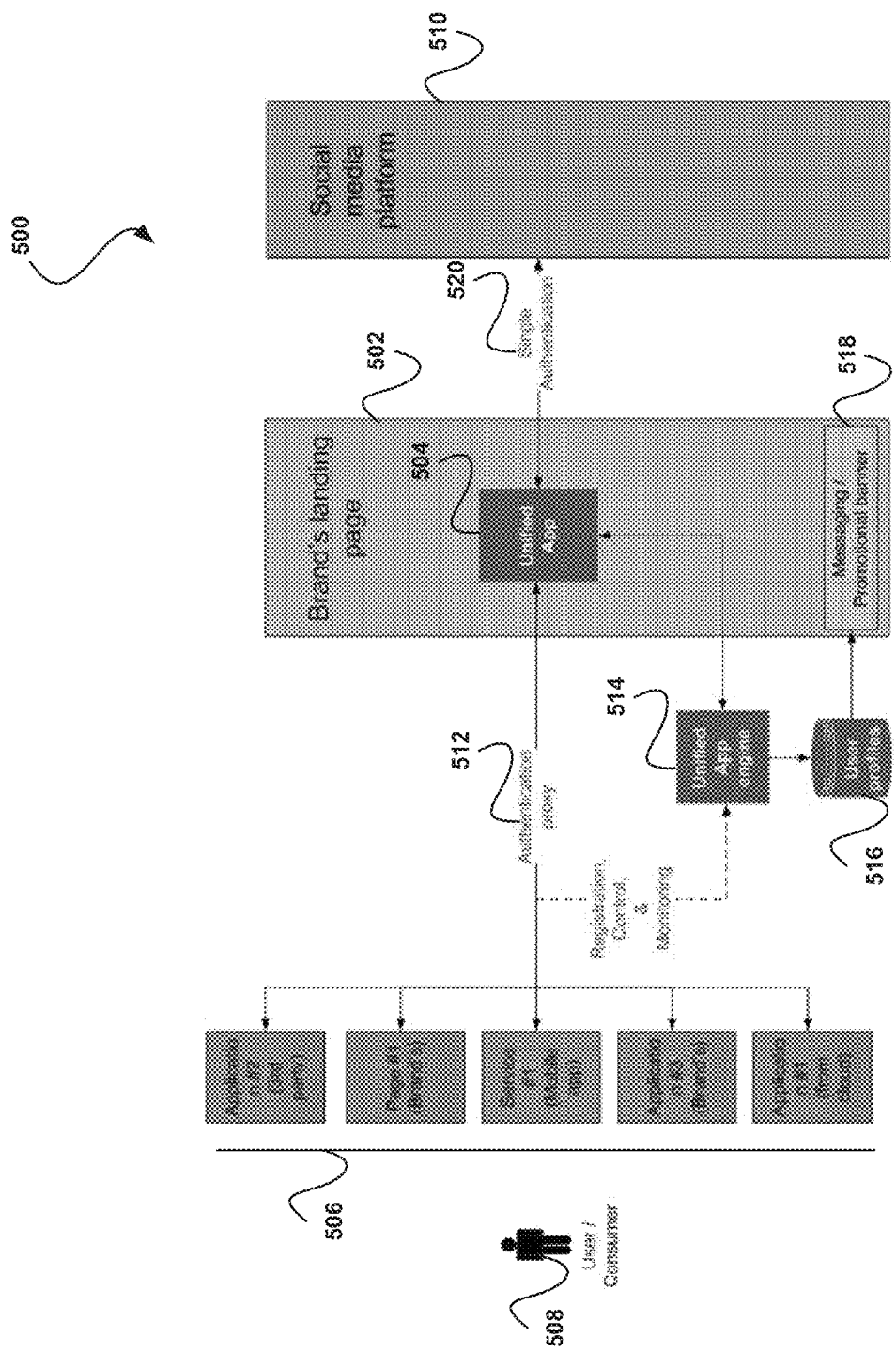
FIG. 5 illustrates an exemplary unified management architecture, in accordance with another embodiment.

FIG. 5 illustrates an exemplary unified management architecture 500, in accordance with another embodiment. As an option, the unified management architecture 500 may be implemented in the context of the details of FIGS. 1-4. Of course, however, the unified management architecture 500 may be implemented in any desired environment. Further, the aforementioned definitions may equally apply to the description below.

As shown, a brand landing page 502 within the unified management architecture 500 includes a unified application 504. Additionally, the unified application 504 provides access to the plurality of services 506 to a user 508. Further, the unified application 504 is in communication with a social media platform 510. In one embodiment, the unified application may manage authentication between the user 508 and the social media platform 510. For example, the user 508 may login to one or more of the plurality of services 506 at the brand landing page 502, where one or more of the plurality of services 506 are provided by the social media platform 510.

Additionally, the login information of the user 508 may be transferred to the unified application 504 via an authentication proxy 512. Further, the unified application 504 may relay the login information of the user 508 associated with the plurality of services 506 provided by the social media platform 510 to the social media platform 510 as a single authentication 520. In another embodiment, one or more of the plurality of services 506 may be provided by the brand (e.g., via a server associated with the brand, etc.).

In this way, the unified application 504 may maintain a single authentication key in front of the social media platform 510. Additionally, by navigating all users and activities to the unified application 504, the architecture 500 may enable central management of the plurality of services 506 and the creation of a unified profile and brand landing page 502 for a user 508 based on all of the user 508's activities across all of the plurality of services 506.

Also, the way the user 508 views and consumes the plurality of services 506 may be differentiated from the way the plurality of services 506 are enabled, managed, and authenticated in front of the social media platform 510. Further, in another embodiment, from the viewpoint of the user 508, the user 508 may access the plurality of services 506 either directly or through the landing page 502.

Further, in one embodiment, each of the plurality of services 506 may be supervised by the unified application 504. For example, each of the plurality of services 506 may have to work according to a protocol provided by the unified application 504. In another example, each of the plurality of services 506 may be authenticated by the unified application 504 (e.g., utilizing a special authentication key provided by the unified application 504, etc.). In this way, both internal and external services within the plurality of services 506 may be launched on the brand landing page 502 and may be managed by the unified application 504.

Further still, the unified application 504 is in communication with a unified application engine 514, which is in turn in communication with a user profiles database 516. In one embodiment, the unified application engine 514 may control registration of the user 508 with respect to the plurality of services 506. In another embodiment, the unified application engine 514 may monitor the actions of the user 508 with respect to the plurality of services 506. In yet another embodiment, based on the monitored actions of the user 508, the unified application engine 514 may create a profile for the user 508, which may be sent to the user profiles database 516 for storage.

Also, in one embodiment, based on the profile for the user 508 stored in the user profiles database 516, the unified application engine 514 may control the allocation of the plurality of services 506 to the user 508. Additionally, a promotional banner 518 may be tailored to the interests of the user 508 based on the profile for the user 508. In this way, value may be extracted in the form of detailed tracking and profiling of the user 508 based on the activity of the user 508 with respect to the consumption of the plurality of services 506.

Additionally, the brand landing page 502 may be personalized for the user 508 based on the activity of the user 508, such that though a plurality of users may return to the same landing page 502, or applications 506 that rely on the unified application 504, the brand may have the ability to expose the users to personalized experiences together with brand messages, promotions, etc. based on each user's preferences. Authorization, eligibility, etc. Further, the telecommunications identity of the user 508 may be coupled with the social identity of the user 508.

Further still, activities of the user 508 across all of the plurality of services 506 may be tracked. Also, a personalized return channel may be provided to the user 508 in the form of the landing page 502. Additionally, the launching of the plurality of services 506 may be separated without having to leverage one or more of the plurality of services 506 for another. Further, the brand may be able to add services to the plurality of services 506 while still optimizing the engagement of all of the plurality of service 506 with their users.

For example, access to any of the plurality of services 506 by the user 508 may be fully identified and classified, and this knowledge about the user 508 may enable a personalized approach (e.g., targeted messages, campaigning, etc.) as well as a personalized experience via the brand landing page 502. Further still, brands that launch a plurality of activities based on abilities provided by one or more social media platforms may better understand their user base by following activities of their users across the plurality of services 506 provided to their users. Also, one-time, unidentified, and visiting users may be identified, tracked, and profiled based on their actions with respect to the plurality of services 506.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising:
    computer code for associating a plurality of social media services provided by a plurality of social media platforms with a unified application of an entity, wherein the social media services include a social messaging service, an image sharing service, and a video sharing service;
    computer code for installing the unified application within a web page of the entity, wherein the unified application is in communication with at least one social media platform that provides the social media services;
    computer code for configuring rules for exposing to a user the plurality of social media services associated with the unified application;
    computer code for controlling a registration of the user with the social media services associated with the unified application, utilizing the unified application;
    computer code for controlling authentication between the user and the plurality of social media platforms when the user logs in to the unified application by relaying login information of the user from the unified application to the plurality of social media platforms;
    computer code for authenticating each of the plurality of social media services utilizing a key provided by the unified application;
    computer code for providing the user access to the plurality of social media services according to the configured rules through the unified application, including providing by the unified application a message, a shared image, and a shared video in accordance with the configured rules; and
    computer code for tracking and recording actions performed by the user while accessing the plurality of social media services using the unified application, the actions including:
        messages viewed by the user,
        videos viewed by the user,
        images viewed by the user, and
        messages sent by the user;
    computer code for recording usage data associated with the user's use of the unified application, the usage data including:
        a time at which the user logged in to the unified application,
        a length of time the user accesses each of the plurality of social media services, and
        a source that referred the user to a landing page within which the unified application is displayed;
    computer code for creating and storing a profile for the user within the unified application, utilizing the recorded actions performed by the user while accessing the plurality of social media services and the recorded usage data; and
    computer code for personalizing the landing page within which the unified application is displayed, and configuring access to the plurality of services, based on the stored profile.

2. The computer program of claim 1, wherein the plurality of social media services include one or more applications.

3. The computer program of claim 1, wherein the plurality of social media services include one or more third party applications, mobile applications, cloud applications, and entity based applications.

4. The computer program of claim 1, wherein one or more of the plurality of social media services are locally installed.

5. The computer program of claim 1, wherein the unified application controls a display of one or more of the plurality of social media services.

6. The computer program of claim 1, wherein the entity includes one or more of a particular brand, organization, company, and individual.

7. The computer program of claim 1, wherein the web page includes a portal associated with the entity.

8. The computer program of claim 1, wherein the unified application is displayed within a window located on the web page.

9. The computer in program of claim 8, wherein each of the plurality of social media services are displayed simultaneously within the window located on the web page.

10. The computer program of claim 1, wherein the plurality of social media services are displayed to the user via the unified application.

11. The computer program of claim 1, wherein the computer program is operable such that a promotional banner is selected based on the profile of the user and is presented to the user when the user accesses the web page.

12. The computer program of claim 11, wherein the computer program is operable such that the unified application manages the plurality of social media services such that the plurality of social media services is seen to the at least one social media platform as a single entity.

13. The computer program of claim 1, wherein each of the plurality of social media services operates according to a protocol provided by the unified application.

14. The computer program of claim 1, wherein personalizing the landing page includes establishing a rule within the unified application for allowing the user to view a particular page within the unified application that is associated with one of the social media services only after visiting a landing page of the entity a predetermined number of times within a predetermined time period.

15. The computer program of claim 1, wherein configuring access to the plurality of services includes establishing a rule within the unified application for allowing installation by the user of one of the social media services from the unified application only if another one of the social media services has been previously installed by the user.

16. The computer program of claim 1, wherein controlling the authentication between the user and the at least one social media platform when the user logs in includes transferring the login information of the user via an authentication proxy to the unified application from which the login information of the user is relayed to the at least one social media platform.

17. The computer program of claim 1, wherein the unified application controls input from the user provided to the social media services, the unified application manages compatibility of a device used by the user to view the social media services, and the unified application maintains the key to be used with the at least one social media platform.

18. A method, comprising:
  associating a plurality of social media services provided by a plurality of social media platforms with a unified application of an entity, wherein the social media services include a social messaging service, an image sharing service, and a video sharing service;
  installing the unified application within a web page of the entity, wherein the unified application is in communication with at least one social media platform that provides the social media services;
  configuring rules for exposing to a user the plurality of social media services associated with the unified application;
  controlling a registration of the user with the social media services associated with the unified application, utilizing the unified application;
  controlling authentication between the user and the plurality of social media platforms when the user logs in to the unified application by relaying login information of the user from the unified application to the plurality of social media platforms;
  authenticating each of the plurality of social media services utilizing a key provided by the unified application;
  providing the user access to the plurality of social media services according to the configured rules through the unified application, including providing by the unified application a message, a shared image, and a shared video in accordance with the configured rules; and
  tracking and recording actions performed by the user while accessing the plurality of social media services, the actions including:
    messages viewed by the user,
    videos viewed by the user,
    images viewed by the user, and
    messages sent by the user:
  recording usage data associated with the user's use of the unified application, the usage data including:
    a time at which the user logged in to the unified application,
    a length of time the user accesses each of the plurality of social media services, and
    a source that referred the user to a landing page within which the unified application is displayed;
  creating and storing a profile for the user within the unified application, utilizing the recorded actions performed by the user while accessing the plurality of social media services and the recorded usage data; and
  personalizing the landing page within which the unified application is displayed, and configuring access to the plurality of services, based on the stored profile.

19. A system, comprising:
  a hardware processor for:
  associating a plurality of social media services provided by a plurality of social media platforms with a unified application of an entity, wherein the social media services include a social messaging service, an image sharing service, and a video sharing service;
  installing the unified application within a web page of the entity, wherein the unified application is in communication with at least one social media platform that provides the social media services;
  configuring rules for exposing to a user the plurality of social media services associated with the unified application;
  controlling a registration of the user with the social media services associated with the unified application, utilizing the unified application;
  controlling authentication between the user and the plurality of social media platforms when the user logs in to the unified application by relaying login information of the user from the unified application to the plurality of social media platforms;
  authenticating each of the plurality of social media services utilized a key provided by the unified application;
  providing the users to the plurality of social media services according to the configured rules through the unified application, including providing by the unified application a message, a shared image, and a shared video in accordance with the configured rules; and
  tracking and recording actions performed by the user while accessing the plurality of social media services, the actions including:
    messages viewed by the user,
    videos viewed by the user,
    images viewed by the user, and
    messages sent by the user;
  recording usage data associated with the user's use of the unified application, the usage data including:
    a time at which the user logged in to the unified application,
    a length of time the user accesses each of the plurality of social media services, and
    a source that referred the user to a landing page within which the unified application is displayed;
  creating and storing a profile for the user within the unified application, utilizing the recorded actions performed by the user while accessing the plurality of social media services and the recorded usage data; and personalizing the landing page within which the unified application is displayed, and configuring access to the plurality of services, based on the stored profile.

20. The system of claim 19, wherein the hardware processor is coupled to memory via a bus.

\* \* \* \* \*

UNITED STATES PATENT AND TRADEMARK OFFICE
CERTIFICATE OF CORRECTION

PATENT NO.         : 9,009,239 B1                                    Page 1 of 1
APPLICATION NO.    : 13/015525
DATED              : April 14, 2015
INVENTOR(S)        : Amit Braytenbaum et al.

It is certified that error appears in the above-identified patent and that said Letters Patent is hereby corrected as shown below:

In the claims,
At column 8, claim number 9, line number 60, please delete "in";
At column 10, claim number 18, line number 3, please replace ":" with --;--;
At column 10, claim number 19, line number 43, please replace "utilized" with --utilizing--; and
At column 10, claim number 19, line number 44, please replace "users" with --user access--.

Signed and Sealed this
Ninth Day of February, 2016

Michelle K. Lee
*Director of the United States Patent and Trademark Office*